Figure 1:
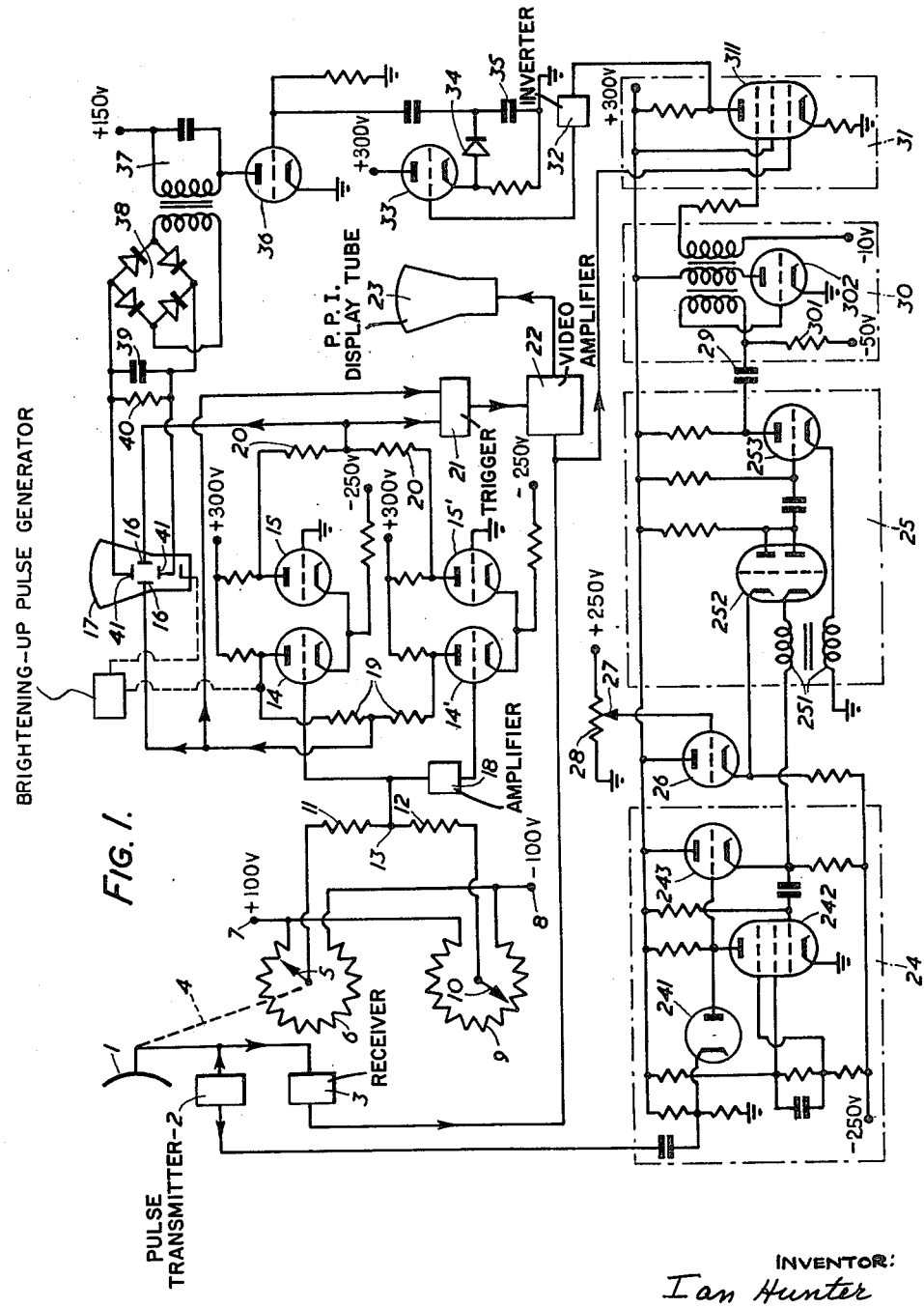

United States Patent Office 3,088,110
Patented Apr. 30, 1963

3,088,110
VARIABLE ZONE DISPLAY RADAR SYSTEMS
Ian Hunter, Chelmsford, England, assignor to Marconi's Wireless Telegraph Company Limited, London, England, a British company
Filed Oct. 9, 1958, Ser. No. 766,359
Claims priority, application Great Britain Nov. 6, 1957
6 Claims. (Cl. 343—11)

This invention relates to radar systems and more particularly to radar systems primarily for marine use.

Marine radar systems as at present in general use employ displays of the well known P.P.I. type. This type of display, though very satisfactory for many purposes, falls short of what is really required for good anti-collision safety at sea. The International Regulations for Preventing Collisions at Sea define risk of collision in terms of compass bearing and lay it down that if the compass bearing of another vessel does not appreciably change, risk of collision shall be deemed to exist. It is accordingly the practice of watch-keeping officers on the bridge to take the bearing of a visually observed vessel and to watch for change of bearing. If appreciable change of bearing does not occur, the watch-keeping officer takes such avoiding action (if any) as may be required by the regulations and by general considerations of safety. If a radar equipment is to be really satisfactory from the anti-collision point of view, it should give a display which will enable the watch-keeping officer to make observations of the same general nature as those which it is his practice to make when he observes another ship visually. The ordinary PPI display does not do this for, in practice, plotting over a period of time is necessary before an officer can determine whether the compass bearing of another ship is changing sufficiently for there to be no risk of collision. The present invention seeks to provide an improved radar display—which will normally, in carrying out the invention, be used in conjunction with an ordinary PPI display—which will satisfy anti-collision requirements more fully than do existing known displays.

According to this invention in its broadest aspect a radar station comprises means for co-ordinately displaying signals representative of echo signals within a predetermined range zone which is variable in range against azimuthal directions within a predetermined limited angle which is variable in azimuth.

The displayed signals representative of echo signals may be range gated received echo signals themselves or a deflecting signal envelope derived therefrom, or they may be the received echo signals themselves ungated, in which case means are provided for brightening up the display tube only during the period in which echo signals are received from the predetermined selected range zone, the tube being dark at other times. As will be apparent the effect produced by this expedient is practically the same as though the echo signals were gated.

According to a feature of this invention a radar station includes means for radio scanning in azimuth; a cathode ray display tube; means for deflecting the ray in said tube in one co-ordinate direction of deflection in dependence upon the momentary azimuthal direction of radio scanning within a predetermined limited angle of azimuth; means for varying in azimuth said limited angle of azimuth; means for deflecting the ray in said tube in the other co-ordinate direction in correspondence with echo signals within a predetermined narrow range zone and received during traverse of said limited angle of azimuth; and means for varying said range zone in range.

Preferably means are provided for increasing the rate of deflection corresponding to azimuthal direction over the centre portion of each deflection sweep in relation to that at the two ends of said sweep.

Preferably also means are provided for brightening up the display tube only during the limited angle azimuthal deflection sweep.

Preferably again means are provided for displaying on the display tube a marker representative of the azimuthal direction corresponding substantially to the central azimuthal direction of the limited angle of azimuth. Where, as will usually be the case, a display arrangement in accordance with this invention is supplementary to a normal PPI display provided in the radar station, means are also provided for displaying on the PPI display tube a marker representative of the central azimuthal direction. Also it is preferred to provide means for displaying on said normal display tube a marker representative of the range to which the narrow range zone is adjusted.

Figure 2:
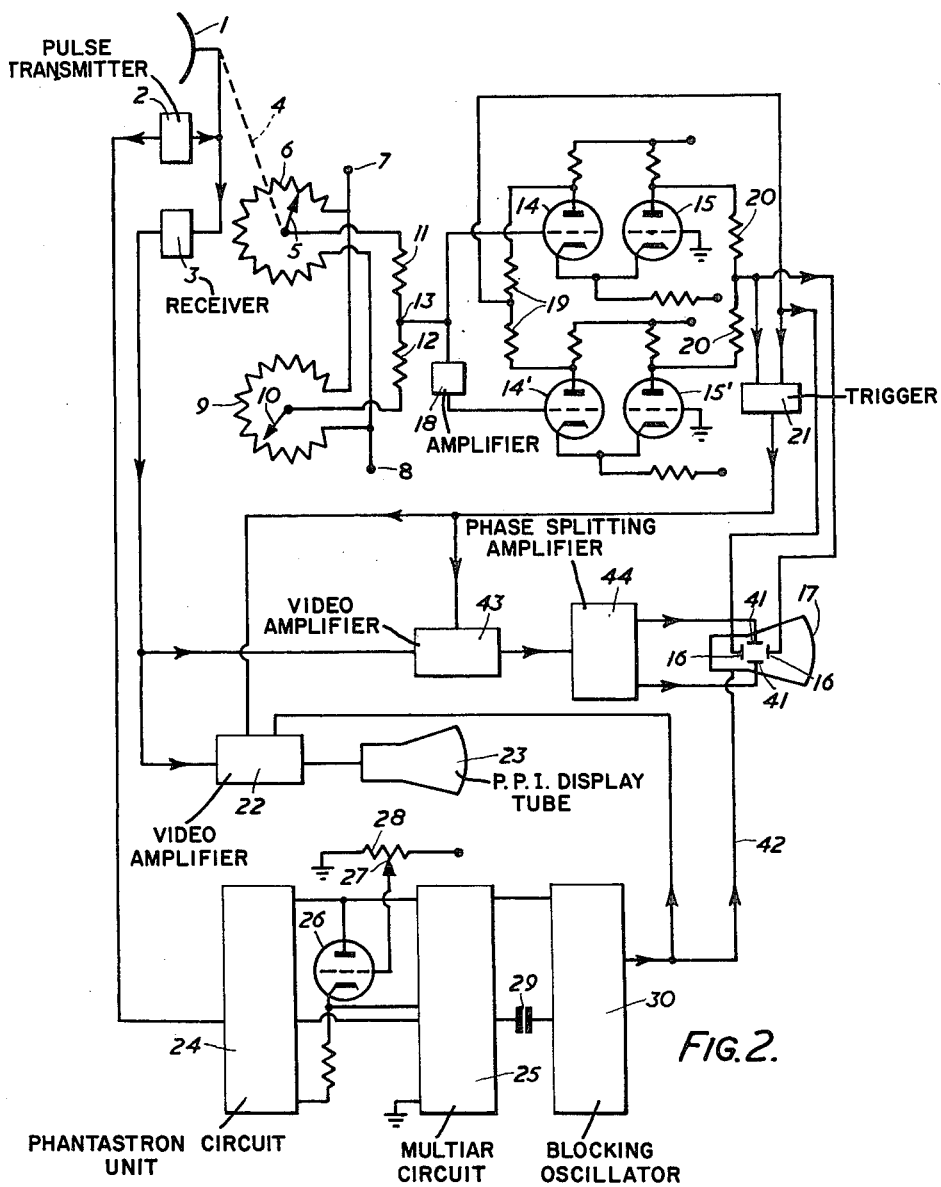

FIGURE 1 is a combined block and schematic representation of a radar system embodying my invention; and FIGURE 2 shows in combined block and schematic form a modification of the system of FIGURE 1 according to another illustrative embodiment of this invention.

Referring to FIGURE 1 the radar station therein shown comprises the usual azimuth scanning aerial system 1 which is rotated in azimuth for radio scanning by an electric motor (not shown). The aerial 1 is fed with pulses from a pulse transmitter 2 of known form, and received echo signals from said aerial are received by a known receiver 3 providing a video signal output. Driven with the aerial 1, as conventionally represented by the chain line 4, is the slider 5 of a potentiometer resistance 6. This resistance is connected between terminals 7 and 8 at the former of which is applied a potential of, for example, +100 volts and at the latter of which is applied a potential of, for example, −100 volts. A second potentiometer resistance 9 is also connected between these two terminals 7 and 8 and its slider 10 is adjustable manually. The two sliders 5 and 10 are connected to the outer ends of two resistances 11 and 12 which are connected together at 13. It will be seen that the voltage at the point 13 will vary as the aerial 1 rotates in azimuth and that during variation it will pass through zero value at a point determined by the setting of the slider 10. Accordingly, by adjusting the slider 10, the azimuthal direction of the aerial 1 at which zero voltage appears at the terminal 13 can be adjusted anywhere within the azimuthal circle. Voltage at the terminal 13 is applied to the grid of one, 14, of a pair of valves 14, 15, the other valve (15) of that pair having its grid earthed. The cathodes of these valves are connected together and through a resistance to a point of suitable negative potential as indicated. The anodes of these valves may be connected (this is not shown) to the opposite plates of a pair of deflecting plates 16 in a cathode ray display tube 17 provided by this invention. If this is done it will be seen that over a limited range of voltage appearing at terminal 13 and extending on either side of the zero voltage value, a deflecting voltage will appear between the plates 16. The value of the deflecting voltage thus appearing will depend upon the momentary azimuthal direction of the aerial 1 within a limited angle of azimuths and the position, in the azimuth circle, of this limited angle will depend on the setting of the slider 10. The extent of the limited range of voltage appearing a terminal 13 and over which deflecting voltages appear between plates 16 is determined by the operating voltages and settings of the valves 14 and 15. Thus, the ray in the tube 17 will be deflected in accordance with momentary azimuth over a limited range of azimuths and the azimuthal position of the centre of this range can be adjusted anywhere in the azimuth circle by adjusting the position of the slider 10. In the actual circuit shown in FIGURE 1, however, the anodes of the valves 14, 15 are not directly connected to the plates 16 but, instead, two further valves 14' and 15', connected in the same way as the valves 14, 15 are provided with the grid of the valve 14' connected to the point 13, not directly, but through an amplifier 18 which may be of adjustable gain. The anodes of the valves 14, 14' are connected together through resistances 19 and the anodes of the valves 15, 15' are similarly connected together through resistances 20. The junction of the resistances 19 is taken to one plate 16 and the junction of resistances 20 to the other plate 16. With this arrangement it will be seen that, as before, the deflection voltage applied between the plates 16 will be representative of momentary azimuth within a limited range of azimuths of the aerial 1 and that (again as before) the azimuth position of this range can be adjusted anywhere in the circle by adjusting the potentiometer slider 10 but that now the rate of deflection (for a given rate of rotation of the aerial 1) will be higher in the middle of each deflection sweep than at the two ends.

The voltage applied between the two plates 16 is also applied to a trigger circuit 21, such for example as a known so-called Multiar or Schmitt circuit which, when triggered, superimposes a pulse or peak voltage signal upon the signals in a suitable stage of a normally provided video amplifier 22 which amplifies video signals from the receiver 3 and applies them for display in a normally provided P.P.I. display tube 23 which, for simplicity, is purely schematically indicated. It will be appreciated that the moment of occurrence of the peaks from the unit 21 will depend upon the setting of the potentiometer 10. These peaks or pulses are used in any convenient manner known per se to produce a radial marker line on the screen of the PPI display tube 23. Such marker line production means are too well known per se to require further description of illustration here. It will be seen that by moving the slider 10 until the radial marker line on the tube 23 passes through a particular target displayed by that tube, the result will be achieved that the limited angle of azimuth corresponding to a deflection sweep in the tube 17 produced by the plates 16 will be centered on the direction of that target.

Synchronizing pulses provided in the usual way in the transmitter 2 to synchronize the pulse transmission thereof are applied to a known so-called phantastron circuit within the block 24. As shown the synchronizing pulses, assumed to be negative going, are fed through the diode 241 to the anode of a pentode 242 which is connected to the known phantastron circuit, thus producing a negative going saw-tooth at the cathode of the valve 243. The unit 24 is followed by a so-called Multiar circuit arrangement in the block 25. As shown the cathode of the valve 243 supplies its negative going saw-tooth through the transformer 251 of the Multiar arrangement, the primary of this transformer being connected to the cathode of one diode of a double diode 252. A valve 26 whose grid receives potential from the slider 27 of a potentiometer 28 across which is connected a suitable source of voltage as indicated has its cathode connected to the cathode of the other diode of the double diode 252. The two diode anodes are connected through a condenser to the control grid of the valve 253 in the Multiar arrangement and resistances complete the known Multiar circuit as shown. It will be seen that, with this arrangement, when the cathode potential of the valve 243 drops below the cathode potential of the valve 26, the diode in whose cathode circuit the primary of transformer 251 is connected will conduct, thus completing the regenerative path of the grid circuit of the valve 253 which accordingly cuts itself off. The time at which this will occur in relation to the time at which a synchronizing pulse is fed in to the diode 241 can be adjusted by adjusting the slider 27 which accordingly provides a range gate adjustment. If desired, adjustment of the slider 27 may be ganged with adjustment of a known range marker arrangement (not shown) connected in any manner well known per se to provide a range ring display in the P.P.I. tube 23.

As will now be seen, each synchronizing signal fed in to the unit 24 will be followed, after a time interval determined by the setting of the slider 27, by a positive going step voltage at the anode of the valve 253. This is differentiated by the condenser 29 following said valve 253 in conjunction with the grid resistance 301 of the valve 302 of a known form of blocking oscillator 30. The positive output from this blocking oscillator is applied to the suppressor grid of the gating valve 311 of a gating valve circuit 31 gating, i.e. "opening," the said valve for the duration of the blocking oscillator pulse. Video signals from the receiver 3 are applied to the control grid of the gating valve 311 at the anode of which will accordingly appear a wave form representative of the gated echo signal, all other echo signals being excluded. This gated echo signal from the valve 311 is inverted by an inverting amplifier 32 and "stretched" by the action of a cathode follower valve 33 in conjunction with a rectifier 34 and capacity 35 so as to add energy to the gated echo while preserving its amplitude. As will be appreciated the "stretched" pulse will be repeated at the transmission pulse repetition rate of the radar station. Output from the valve 33 is fed to an amplifier 36 having a band pass filter 37 in its output circuit. This band pass filter is transformer-coupled to a rectifier bridge circuit 38, the output from which is smoothed by the elements 39 and 40 and applied between the plates 41 of a pair of plates in the tube 17 at right angles to the plates 16.

It will thus be seen that the tube 17 will display an envelope waveform corresponding to signals from a selected target at a range determined by the setting of the slider 27 and within a limited angle of azimuths whose central direction is determined by the setting of the slider 10. The azimuth deflection co-ordinate will be very much "blown-up" and with the particular arrangement shown will be "blown-up" more in the centre of the deflection sweep than at the edges. The display in the tube 17 will normally be of hump-like form and, so long as the target which has been selected by adjustment of the sliders 10 and 27 remains on a constant bearing, this hump-like display will remain fixed on the tube screen. If, however, the bearing of the target changes, the hump-like display will move sideways in the appropriate direction. If desired, the Multiar 25 may be used also (this is not shown in FIGURE 1) to produce a central vertical marker line in the display of the tube 17. With such a marker, alteration of the bearing of the selected target will be made more apparent by sideways movement of the hump-like display with reference to the said marker. Thus it will be seen that the watch-keeping officer may select any target on the PPI display tube 23 for investigation; may adjust the azimuthal and range markers (coupled respectively with the sliders 10 and 27) on the PPI tube until they intersect at the selected target; and will then see that target displayed in the tube 17 as an envelope of echo signals against a time base of azimuths within a limited angle and will be able to observe whether the target is of a constant bearing or not. The potentiometer 9 may, and normally will, be marked in angles of azimuth so that the direction of the target selected for observation can be read off on the scale of the potentiometer 9—10. The similarity of this form of observation to the one made by a watch-keeping officer when observing visually from the bridge will at once be apparent.

The modification shown in FIGURE 2, which is not the preferred modification, is shown more schematically than is the embodiment of FIGURE 1, since much of the circuit of FIGURE 2 is mere repetition of that of FIGURE 1. As will be seen, azimuth and range selection are obtained in exactly the same way as in FIGURE 1. The double potentiometer arrangement 5—6, 9—10 with the associated valves 14, 14', 15, 15', the phantastron circuit unit 24, the circuit of the valve 26, the Multiar circuit 25 and the blocking oscillator 30 are all as in FIGURE 1. The blocking oscillator 30, however, provides a brightening-up pulse to the tube 17 over lead 42 to ensure that this tube is "dark" except when the echoes return from the desired range zone as selected by the setting of the slider 27. The generator 30 is also shown as superimposing a marker pulse on the signals in the video amplifier 22 which feeds the normally provided PPI display tube 23. It will be seen that this expedient of brightening the tube produces much the same effect as would be obtained were the brightening control omitted and the video echo signals gated so as to be passed to the tube only during the periods when echoes can be received from the range zone selected by slider 27. Accordingly FIGURE 2 could be modified by taking the lead 42 (shown as going to the tube 17) to the gating control grid of a gating amplifier (like the amplifier 31 of FIGURE 1) incorporated in another video amplifier 43. It is not thought necessary to illustrate this modification separately. The receiver 3 supplies video signals not only to the video amplifier 22, but to the other video amplifier 43 which feeds the deflection plates 41 of tube 17 through a phase-splitting amplifier 44. The Multiar or Schmitt trigger circuit 21 feeds its output peaks or pulses to the amplifier 22 as in FIGURE 1 and also to the amplifier 43. The result achieved by the apparatus of FIGURE 2, which is slightly simpler than the apparatus of FIGURE 1, is very like that achieved by the said apparatus of FIGURE 1, the principal difference being that the display on the tube 17 is no longer of envelope form but is a hump-like display of the same general shape but "filled in," being derived from the video signals themselves. It is for this reason that the arrangement of FIGURE 1 is preferred to that of FIGURE 2, since, other things being equal, the display given by the arrangement of FIGURE 1 will be brighter and clearer than that of FIGURE 2.

If desired, and preferably, the display tube 17 of both embodiments (that of FIGURES 1 and 2) is also subjected to brightening control so as to be dark except when the aerial 1 is directed in the limited angle of azimuths selected by the potentiometer slider 10. Means for effecting such brightening are shown in FIG. 1 as a brightening-up pulse generator connected to the cathode of cathode ray tube 17. Such a brightening pulse is conveniently derived from the pulse generator which is controlled by the voltage produced at the anodes of valves 14 and 15.

I claim:

1. A radar system including a rotatable aerial, a cathode ray display tube, wave generating means, said means being synchronized with the rotation of said aerial, said means being connected to deflect the ray of said tube in one co-ordinate direction over a predetermined limited angle of azimuth and to provide a deflection sweep whose rate of deflection is greater over the center part of the sweep than at its ends, means to vary in azimuth said limited angle of azimuth, a radar receiver, said receiver being connected to deflect the ray in said tube in the other co-ordinate direction in correspondence with received echo signals, a range gating signal generator and means for coupling said range gating signal generator to said display tube to permit the display of signals received only from a predetermined range zone.

2. A radar system as in claim 1, wherein said wave generating means include a generator whose wave output is linearly related to the instantaneous azimuth of the aerial and said generating means is connected to apply said last-mentioned output to deflect the ray of the display tube via parallel connected paths having means for providing different levels of amplification.

3. A system as claimed in claim 1, wherein means are provided for brightening the cathode ray beam of the display tube only during the limited angle azimuthal deflection sweep.

4. A radar system as claimed in claim 1, further comprising a PPI display tube, and wherein means are also provided for displaying on the PPI display tube, a marker representative of the azimuthal direction corresponding substantially to the central azimuthal direction of the limited angle of azimuth.

5. A system as claimed in claim 4, including means for displaying on said PPI display tube, a marker representative of the range of said predetermined range zone.

6. A radar system according to claim 1, wherein said means for coupling said range gating signal generator to said display tube includes a gate having one input connected to said receiver and another input connected to said range gating signal generator, whereby said range gating signal generator controls said gate to permit the passage of pulses from said receiver to said display tube.

References Cited in the file of this patent

UNITED STATES PATENTS

| | | |
|---|---|---|
| 2,422,975 | Nicholson | June 24, 1947 |
| 2,444,031 | Busignies | June 29, 1948 |
| 2,682,657 | Haworth | June 29, 1954 |
| 2,716,234 | Lester et al. | Aug. 23, 1955 |
| 2,775,757 | Ellsworth et al. | Dec. 25, 1956 |